United States Patent [19]

Gorgé

[11] Patent Number: 4,733,564
[45] Date of Patent: Mar. 29, 1988

[54] PRESSURE GAUGE WITH A CAPSULE CLOSED BY A RESILIENT MEMBRANE

[75] Inventor: André Gorgé, Moutier, Switzerland

[73] Assignee: Charles Gorge, S.A., Moutier, Switzerland

[21] Appl. No.: 885,881

[22] Filed: Jul. 15, 1986

[30] Foreign Application Priority Data

Jul. 19, 1985 [CH] Switzerland ............ 85810333

[51] Int. Cl.$^4$ ............................................. G01L 7/10
[52] U.S. Cl. .............................. 73/715; 73/729; 73/756
[58] Field of Search .............. 73/715, 729, 146.8, 73/386, 387, 756

[56] References Cited

U.S. PATENT DOCUMENTS

| 15,624 | 8/1856 | Shaler | 73/729 |
| 1,411,917 | 4/1922 | Harris | 73/146.8 |
| 1,761,130 | 6/1930 | Kennedy | 73/729 |
| 4,050,314 | 9/1977 | Longhetto | 73/715 |
| 4,240,297 | 12/1980 | Speidel | 73/715 |
| 4,245,508 | 1/1981 | Andresen, Jr. | 73/729 |
| 4,543,824 | 10/1985 | Marterer | 73/729 |

FOREIGN PATENT DOCUMENTS 2812755  5/1979  Fed. Rep. of Germany .

Primary Examiner—Donald O. Woodiel
Attorney, Agent, or Firm—Pollock, Vande Sande & Priddy

[57] ABSTRACT

The pressure gauge with a capsule formed by a cylindrical low cap sealed by a circular resilient membrane comprises, between this membrane and an indicating pointer, a kinematic linkage exclusively composed of three pairs of intermeshing gears. A spiral spring inserted under a small tension between the pointer shaft and a fixed stud takes up the lost motions of the gears thus maintaining a reliable connection between the membrane and the indicating pointer. Thanks to that linkage the ratio between the membrane deflections and the angular displacements of the pointer is rigorously linear. Furthermore, since the membrane deflections are directly proportional to the pressures in the capsule, the divisions of the dial graduation, which correspond to those pressures, are strictly equidistant.

2 Claims, 4 Drawing Figures

PRESSURE GAUGE WITH A CAPSULE CLOSED BY A RESILIENT MEMBRANE

BACKGROUND OF THE INVENTION

1. Field of the Invention

This invention relates to the pressure gauge of the type comprising a capsule tightly closed by a resilient membrane, an indicating pointer and a mechanism transmitting the deflections of the membrane to that pointer.

2. Description of the Prior Art

With the pressure gauges of the type considered, which are known in the art, the mechanism transmitting the deflections of the resilient membrane to the indicating pointer at least comprises a lever permanently remaining in contact with said membrane.

Now, when the membrane is deflected upon executing a measure, the end of the lever, which is in contact with the membrane, moves along an arc of a circle, around the pivoting axis of the lever. Moreover, that lever end slides on the membrane, thereby moving more or less away from the central point thereof. Accordingly, the angles of rotation of the indicating pointer are not rigorously proportional to the deflections of the membrane. Since these deflections are, for their part, proportional to the pressures to be measured, provided that these pressures lie within the measuring range for which the pressure gauge is conceived, the angles of rotation of the indicating pointer are therefore not proportional to the pressures to be measured.

That lack of linearity has the great disadvantage to compel the manufacturers of series of pressure gauges to individually graduate the dials thereof one after the other. The sliding of the lever on the capsule membrane during the measures also has the drawback to produce a wear which alters the indications of the pressure gauge in the long run.

SUMMARY OF THE INVENTION

The invention aims to create a pressure gauge, the manufacture of which is easier than that of the pressure gauges known in the art, without sacrificing the precision of its indications. Therefore, with the pressure gauge according to the invention the relation between the deflections of the capsule membrane and the angles of rotation of the indicating pointer is rigorously linear. As a result thereof, the graduations of the pressure gauge dial are equidistant so that these dials no longer need be individually graduated. The dials of a series can, on the contrary, be graduated in advance in an identical manner.

It is also an object of the invention to provide a pressure gauge of the type considered with a mechanism transmitting the deflections of the membrane to the indicating pointer, which exclusively consists of a gear train.

Further objects of the invention will become apparent in the course of the following description.

BRIEF DESCRIPTION OF THE DRAWINGS

One embodiment of the pressure gauge according to the invention is represented diagrammatically and simply by way of example in the accompanying drawings in which.

DESCRIPTION OF THE PREFERRED EMBODIMENT

Figure 1:
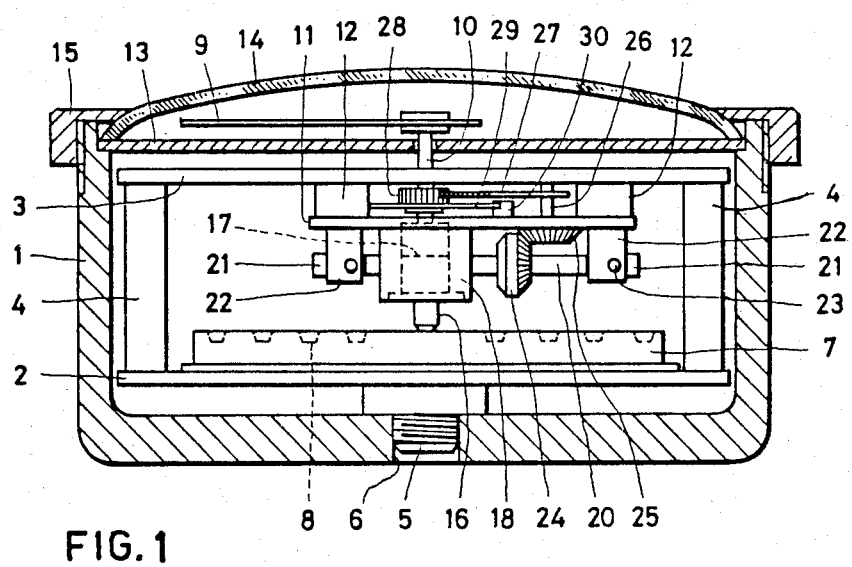
FIG. 1 is an elevational view of that embodiment with some parts in section.

The pressure gauge represented is mounted in a cylindrical cap-shaped casing 1. Its members are held by a frame comprising two plates 2, 3 fixed together by pillars 4. This frame is secured to casing 1 by a threaded stud 5 screwed in a tapped central bore 6 of the bottom of casing 1.

The pressure gauge capsule, which is constituted by a low cap 7 tightly closed by a corrugated resilient membrane 8, is fixed against the inner face of plate 2. The inner space of this capsule can be set, through an axial bore of stud 5 and a conduct (not shown), into communication with an enclosure, the inner pressure of which is to be measured.

Reading that pressure is enabled by an indicating pointer 9 set on a shaft 10 pivoted in plate 3 and in a triangular bridge 11 fixed to plate 3 by means of three pillars 12. The pointer 9 moves opposite a graduated dial 13. Casing 1 is closed by a glass 14 held in place by a bezel 15 screwed onto casing 1.

Figure 3:
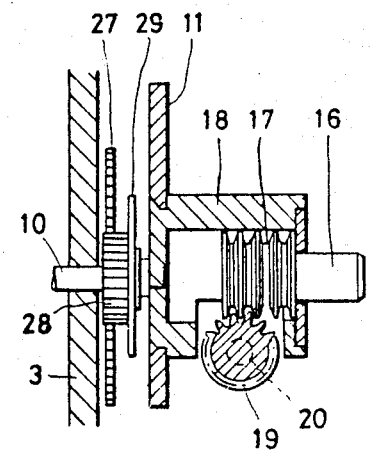
FIG. 3 is a cross-section along line III—III of FIG. 2.

The deflections of membrane 8 under the effect of the pressures to be measured are transmitted to pointer 9 by a mechanism which firstly comprises a shaft 16 having a grooved head 17 confined within a cylindrical box 18 riveted in an opening of bridge 11 (FIG. 3). The head 17 can freely slide in box 18, but without play. The location of box 18 is chosen so that shaft 16 and capsule 7, 8 will be coaxial.

Figure 2:
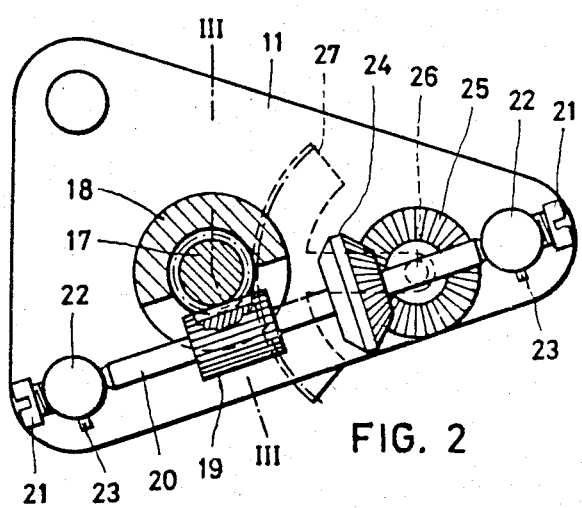
FIG. 2 is a view of part of FIG. 1 from the bottom side thereof and on a larger scale.

The grooved head 17 of shaft 16 operates as a toothed rack. It drives a pinion 19 made integral with an arbor 20 parallel to plates 2, 3 and having conical end portions pivoted in conical openings of screws 21 screwed in projections 22 of two pillars 12 (FIG. 2). Locking screws 23 prevent screws 21 from an inopportune unscrewing.

Arbor 20 also carries a wheel 24 with a conical toothing meshing with a similar wheel 25 set on an overhanging portion of an arbor 26 perpendicular to plates 2, 3 and pivoted in plate 3 and bridge 11. to transmit the rotations of arbor 20 and arbor 26 any other angular gear could just as well be resorted to. Wheel 24 could for instance be replaced by a crown wheel meshing with a spur wheel provided in lieu of wheel 25.

Between the two frame parts 3 and 11 arbor 26 carries a toothed sector 27 meshing with a pinion 28 set on shaft 10 carrying pointer 9. A spiral spring 29 is inserted under a small tension between shaft 10 and a stud 30 fixed to bridge 11. The spiral spring 29 permanently holds the lower end face of shaft 16 in contact with the central point of membrane 8, while taking up the lost motions of the gears disclosed.

Figure 4:
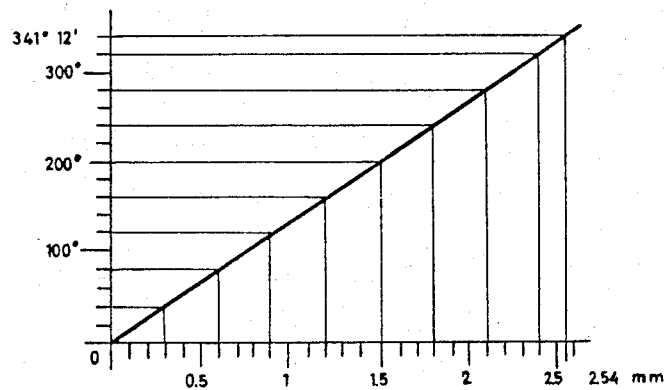
FIG. 4 is a diagram illustrating the mode of operation of the pressure gauge according to the invention.

It results from the foregoing description that the kinematic linkage between membrane 8 and pointer 9 is exclusively ensured by gears 17/19, 24/25 and 27/28. These gears thus ensure the perfect linearity of the ratio between the deflections of membrane 8 and the angles of rotation of pointer 9. That linearity is illustrated by the diagram of FIG. 4 wherein the displacements of shaft 16 in millimeters are indicated as abscissas and the angular displacements of pointer 9 in degrees are indicated in ordinates. Since the deflections of the central point of membrane 8 and consequently of shaft 16 are rigorously proportional to the pressures prevailing in capsule 7, 8 of the pressure gauge, provided that those pressures lie in the measuring range for which the pressure gauge is conceived, the pressure gauge dials of a series may be graduated in advance in an identical manner.

The pressure gauge according to the invention can be used for different purposes. However, it is more particularly intended to measure the blood pressure.

What is claimed is:

1. A pressure gauge comprising, in combination:
   a cylindrical cap-shaped casing;
   a capsule formed by
      a cylindrical low cap fixed to the bottom of said casing and being substantially coaxial therewith, and by
      a circular resilient membrane substantially parallel to the bottom of said casing and tightly sealing said cap;
   a graduated dial having equidistant divisions, being located in the upper part of said casing, and being parallel to the bottom thereof and coaxial therewith;
   an indicating pointer movable over said dial, around the center thereof;
   a toothed rack reliably following the displacements of the central point of said membrane in a direction perpendicular thereto;
   a first arbor parallel to the bottom of said casing;
   a first pinion on said first arbor, meshing with said rack;
   a first angular gear on said first arbor;
   a second arbor perpendicular to the bottom of said casing;
   a second angular gear on said second arbor meshing with said first angular gear;
   a toothed sector on said second arbor;
   a shaft carrying said pointer, and
   a second pinion on said shaft, meshing with said toothed sector.

2. A pressure gauge according to claim 1, wherein a spiral spring is inserted under a small tension between the shaft carrying said pointer and a point being fixed with respect to said casing.

* * * * *